Dec. 20, 1955 H. H. HAMLIN 2,727,336

CRYSTAL MACHINING APPARATUS

Filed Aug. 24, 1953 5 Sheets-Sheet 1

*INVENTOR.*

HALLEY H. HAMLIN

*BY* William J. Flynn

ATTORNEY

Dec. 20, 1955 H. H. HAMLIN 2,727,336

CRYSTAL MACHINING APPARATUS

Filed Aug. 24, 1953 5 Sheets-Sheet 2

INVENTOR.
HALLEY H. HAMLIN
BY
William J. Flynn
ATTORNEY

Dec. 20, 1955 H. H. HAMLIN 2,727,336

CRYSTAL MACHINING APPARATUS

Filed Aug. 24, 1953 5 Sheets-Sheet 3

INVENTOR.
HALLEY H. HAMLIN
BY William J. Flynn
ATTORNEY

INVENTOR.
HALLEY H. HAMLIN
BY William J. Flynn
ATTORNEY

Dec. 20, 1955 H. H. HAMLIN 2,727,336

CRYSTAL MACHINING APPARATUS

Filed Aug. 24, 1953 5 Sheets-Sheet 5

INVENTOR.
HALLEY H. HAMLIN
BY
William J. Flynn
ATTORNEY 2,727,336
Patented Dec. 20, 1955

2,727,336

CRYSTAL MACHINING APPARATUS

Halley H. Hamlin, Lyndhurst, Ohio, assignor to Clevite Corporation, Cleveland, Ohio, a corporation of Ohio Application August 24, 1953, Serial No. 375,955

12 Claims. (Cl. 51—3)

This invention relates to apparatus for machining piezoelectric crystals, such as quartz or primary ammonium phosphate crystals.

In the production of piezoelectric crystal plates for use in various types of electrical and electro-mechanical equipment, the crystal is cut into rough crystal slabs larger than the intended size of the finished crystal plate. These rough or unfinished crystal slabs must then be sawed down to the specified size and their major faces and edge faces ground smooth to produce finished crystal plates of the desired size and operating characteristics. In the past, these machining operations have been carried out on individual rough crystal slabs a step at a time, resulting in unnecessary expense because of the continual close attention required of the operators and the relatively slow rate at which finished crystal plates could be produced.

It is an object of the present invention to provide novel and improved apparatus for machining rough crystal slabs to produce finished piezoelectric crystal plates.

It is also an object of this invention to provide novel apparatus for machining rough crystal slabs into finished piezoelectric crystal plates which performs automatically machining operations which formerly required the active participation and close attention of the operator.

Another object of this invention is to provide novel apparatus for performing machining operations on rough crystal slabs to facilitate the production of finished piezoelectric crystal plates with a minimum of spoilage of the crystal slabs in these machining operations.

Another object of this invention is to provide novel apparatus for machining rough piezoelectric crystal slabs which has provision for clamping the crystal slabs on supports carried by conveyor mechanism by which the crystal slabs are advanced past power driven saws to have segments of the crystal slabs severed off and which is operative upon the continued advance of the conveyor mechanism to release the clamping force on the crystal slabs so that they may be removed from the respective supports after having been sawed.

It is also a specific object of this invention to provide a novel mechanism for machining rough crystal slabs having provision for advancing the crystal slabs through a plurality of machining operations along a single conveyor.

An additional specific object of the present invention is to provide a novel mechanism for machining rough crystal slabs having provision for carrying on a common support a plurality of the rough crystal slabs which are sawed down to smaller size while carried on the support.

Other and further objects of the present invention will be apparent from the following description of preferred embodiments thereof, which are illustrated in the accompanying drawings to show the principles and mode of operation of this invention without, however, intending that the present invention be construed as limited to the specific structures of these embodiments.

Figure 1:
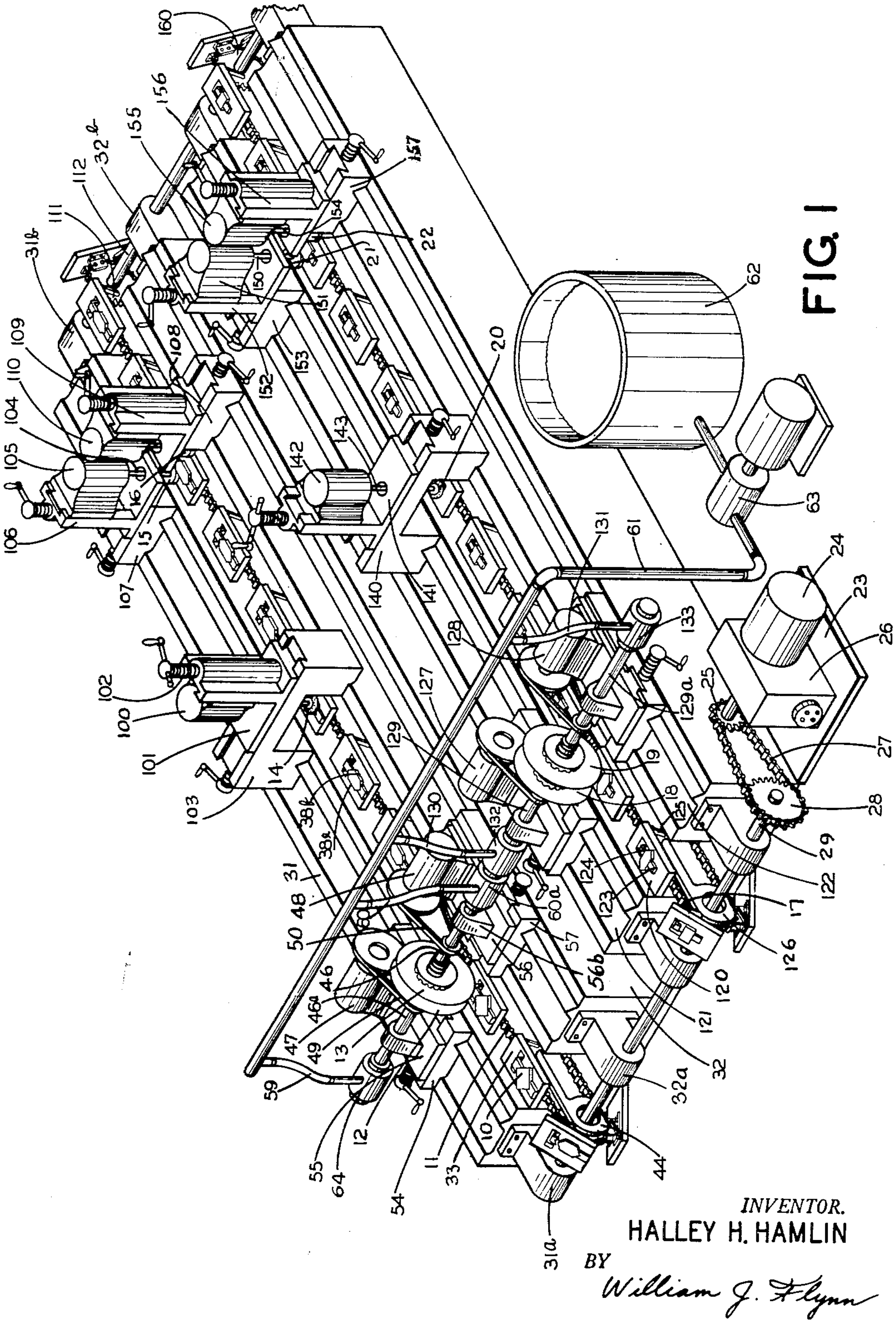
Figure 1 is a perspective view of one form of a complete mechanism according to the present invention for performing sawing, face grinding and edge grinding operations on a piezoelectric crystal slab which has previously been cut from a crystal.

In order to facilitate an understanding of the overall operation of the machine of Fig. 1, the broad functioning of the main components of the mechanism will first be outlined. Referring to Fig. 1, the rectangular original crystal slabs 10, from which the finished crystal plates are to be machined, are placed on holders carried by a first endless conveyor 11. The conveyor carries each slab past a first machining station at which the rotary saws 12, 13 cut off a first pair of opposite corners on the slab. At a second station along conveyor 11 the upper face of each slab is ground smooth by a grinder 14, after which this conveyor advances the slab past a pair of spaced grinding wheels 15, 16 at a third station which grind smooth the side edges of the slab previously formed by the action of the saws 12, 13. The partly machined crystal slab is then removed from the first conveyor 11 and is placed, with its smooth face down, on a holder carried by a second endless conveyor 17 past a pair of rotary saws 18, 19, which cut off the other original opposite corners of the initial rectangular crystal slab, past a grinder 20 which grinds smooth the other major face of the crystal slab, and past a pair of grinding wheels 21, 22 which grind smooth the opposite side edges of the slab which were formed by the action of the saws 18, 19. The finished crystal plate when removed from its holder on conveyor 17 is then suitable for use as a piezoelectric crystal element in any of the known uses to which such elements are put.

*Drive for conveyors*

Referring now in detail to the component parts of this apparatus, there is provided a rigid base 23 which supports a drive motor 24 for advancing both of the endless conveyors 11 and 17. Motor 24 drives a sprocket 25 through a speed reduction unit 26. Sprocket 25 through a chain 27 drives a larger sprocket 28 secured to a drive shaft 29. Shaft 29 carries rigidly a toothed sprocket 30 (Fig. 3) which meshes with the pivotally interconnected chain links making up the first conveyor 11. In like manner, another sprocket (not shown) carried by shaft 29 has its teeth meshing with the chain links making up the second conveyor belt 17. In this manner, both of the conveyors 11 and 17 are driven continuously at relatively slow speeds from the drive motor 24.

The first endless conveyor 11 runs lengthwise along the space between the fixed guides 31, 32 (Fig. 1). These guides at one end carry bearing blocks 31a, 32a, respectively, which support drive shaft 29 for rotation.

*Crystal slab support on conveyor and release therefor*

Conveyor 11 carries a plurality of support blocks 33 (Fig. 4) upon which the rough crystal slabs are retained during the first three machining operations. Each of these support blocks has attached to its underside a pair of depending angle brackets 34 formed with spaced holes which receive bolts 35 connected to the spaced hollow cross pins 36 of the chain link conveyor 11, as best seen in Fig. 4. When assembled, the support block 33 has its angle brackets 34 extending down along the outer sides of the conveyor 11. At its upper face (Fig. 3) each of the support blocks 33 carries a fixed abutment 37 defining a right-angled V-shaped recess for receiving snugly one of the corners 38a of the original crystal slab 38. The opposite forward corner 38b of this crystal slab normally is received at a V-shaped recess 39 formed in one end of a pivoted clamping lever 40 mounted on support block 33. Clamping lever 40 includes a pivotally mounted cross pin 41 located at a hole 42 in the support block. A compression coil spring 43 normally biases the clamping lever 40 counterclockwise in Fig. 3 to position its V-shaped upper end tightly against the adjacent corner 38b of the crystal slab 38 and forcing the opposite corner 38a of the crystal slab against the abutment 37, thereby retaining the crystal slab securely in place on the support block 33. At this time the upper faces of both the abutment 37 and clamping lever 40 are positioned lower than the upper face of the crystal slab.

At one end of conveyor 11, at shaft 29, there is provided a fixed cam 44 (Fig. 3) located at one side of rotary sprocket 30. This cam has a peripheral cam face positioned to be engaged by the outer end of a depending arm 45 of clamping lever 40, so that when the particular support block 33 on the conveyor passes up around shaft 29 the lever arm 45 rides across the peripheral surface of cam 44, which pivots the clamping lever 40 clockwise against the bias of spring 43 to move the V-shaped, slab-engaging end of the clamping lever away from the adjacent corner 38b of the crystal slab, thereby releasing the clamping force on this crystal slab. With this arrangement, at this location a partially machined crystal slab, which has been through the various machining operations along conveyor 11, may be removed manually from its support block and a new unfinished crystal slab placed thereon with one corner received in the V-shaped recess of abutment 37. Then, as the conveyor continues its advance, the clamping lever arm 45 rides beyond the forward end of cam 44 and spring 43 positions clamping lever 40 with its V-shaped recess 39 in engagement with the adjacent corner of the crystal slab to clamp the crystal slab securely on holder block 33, as described. This condition prevails throughout the remainder of the travel of this holder block until another complete circuit of conveyor 11 is completed, at which time the coaction between cam 44 and clamping lever 40 enables the manual removal of the partly machined crystal slab and the manual insertion of the next rough crystal slab on the holder.

*Sawing mechanism at first conveyor*

At the first machining station along conveyor 11 the rotary saw blades 12, 13 are in the form of smooth-edged cutting discs and are positioned with their lower peripheries located to saw off segments of the crystal slab at its opposite side corners 38c and 38d, so as to form the opposite straight side edges 38e and 38f on the crystal slab (Fig. 1). In this instance, these side edges extend at 45° to the major axes of the original crystal slab. The saw blades 12, 13 are carried by hollow rotary drive shafts 46a and 46.

Figure 2:
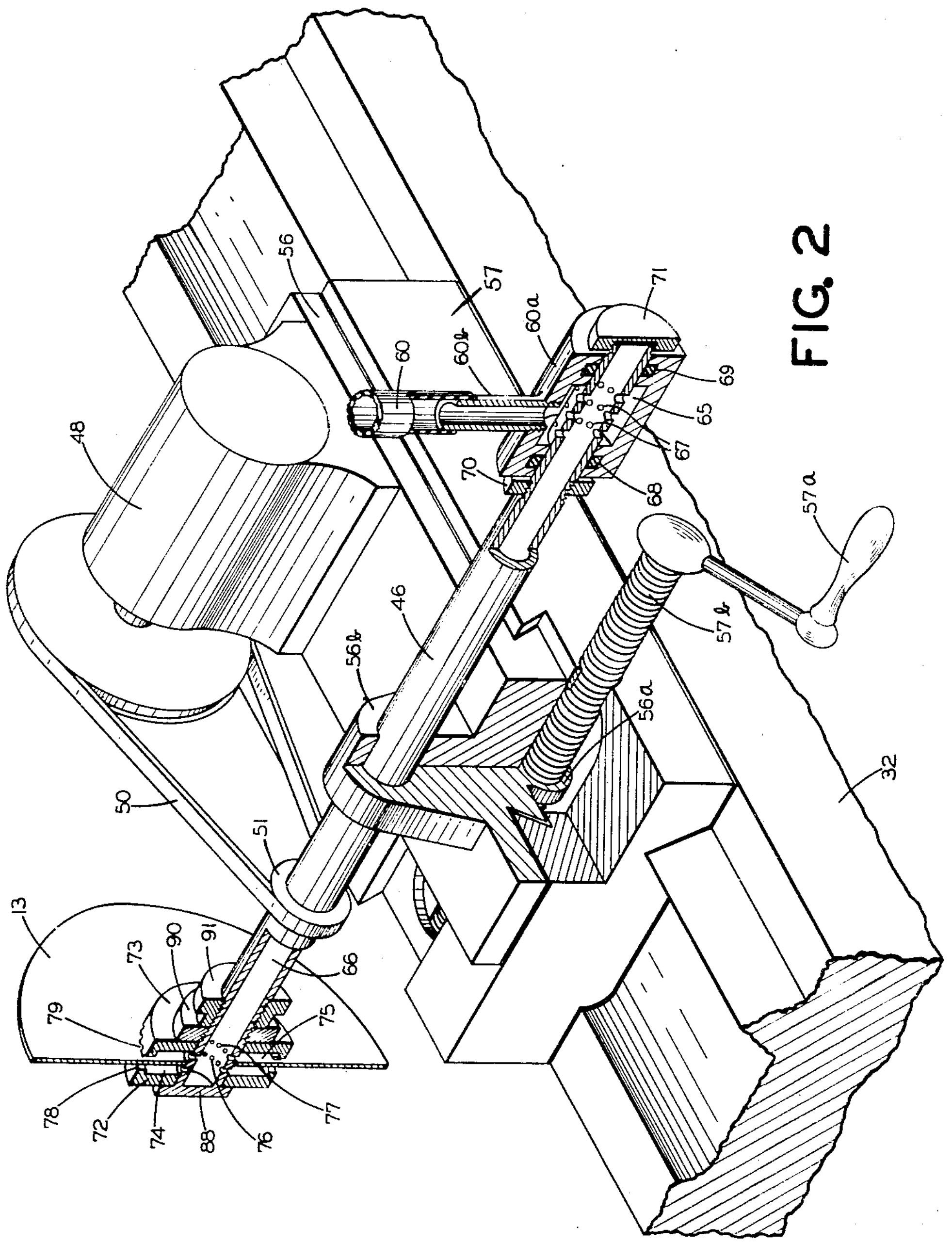
Figure 2 is an enlarged fragmentary perspective view, with parts broken away, showing one of the saw mechanisms in the Fig. 1 assembly.

The mounting and drive for saw blade 13 is shown in enlarged detail in Fig. 2. The drive motor 48 for saw blade 13 is mounted on a base 56, which is adjustable along ways extending across a bed 57 transversely of the path of travel of conveyor 11. Bed 57 is positioned on top of the horizontal guide 32. This adjustment of base 56 is effected through a manual crank 57a carried by a lead screw 57b which extends through base 56 and which meshes with a lead nut 56a integral with base 56. Base 56 also carries an integral upstanding collar 56b to which shaft 46 is keyed axially in any suitable manner permitting the rotation of this shaft. Thus, by turning crank 57a the saw blade 13 may be adjusted transversely of the path of travel of conveyor 11 to position this saw blade to sever the desired portion of the crystal slabs carried by the conveyor. The drive from motor 48 to shaft 46 is through a belt 50 driven by the motor and extending around an enlarged peripheral hub 51 integral with shaft 46.

In order to minimize the likelihood of fracturing the crystal slab due to excessive heat during the sawing operation, there is provided an arrangement for spraying the saws at their cutting edges with a suitable liquid, such as ethylene glycol or a saturated water solution of the crystal salt. In the assembly for saw blade 12, shaft 46 is hollow and is supplied with the liquid from downwardly extending flexible rubber hose 60 which leads from a conduit 61 which receives the liquid pumped from a reservoir 62 by a pump 63 (Fig. 1). At its lower end hose 60 is received on the upper end of a nipple 60b projecting up from a hollow sleeve 60a which forms a bearing for shaft 46. A chamber 65 in sleeve 60a communicates with the longitudinal shaft passage 66 through a plurality of holes 67 formed in the shaft. O-ring seals 68, 69 prevent leakage of the liquid out of chamber 65 along the outer periphery of the shaft. Nuts 70, 71 are threaded onto shaft 46 at opposite ends of sleeve 60a to maintain a fixed axial relation between the sleeve and the shaft.

At opposite sides of saw blade 13 the shaft 46 carries a pair of hollow fittings 72, 73 abutting against the respective saw blade faces and formed with annular chambers 74, 75, respectively, which extend around shaft 46 and which communicate with the shaft passage 66 through series of holes 76, 77 formed in the shaft. At their respective outer peripheries the fittings 72, 73 are formed with radial passages 78, 79 at the opposite faces of saw 13 which lead from the chambers 74, 75 to pass therefrom the liquid delivered to shaft passage 66. These liquid discharge passages 78, 79 are contiguous to, and open at, the respective opposite faces of saw blade 13. With this arrangement, as the assembly of saw blade 13, fittings 72, 73 and shaft 46 rotates, the liquid is passed radially outward through the discharge openings 78, 79 in the fittings out along the faces of the saw blade to the peripheral cutting edge thereof.

In the saw blade assembly, fitting 72 abuts against an integral peripheral enlargement 88 at the adjacent closed end of shaft 46. A washer 90 and an abutting lock nut 91 are threaded onto shaft 46 and bear against fitting 73 to force the assembly of the saw blades, fittings and spacer tightly against shaft enlargement 88, thereby locating saw blade 13 securely at the desired axial location on shaft 46.

The mounting, drive, and liquid spray arrangement for the other saw blade 12 are identical to that just described for saw blade 13, and hence need not be described in detail here. In general, the assembly for saw blade 12 includes the drive motor 47 mounted on a base 55 which is adjustable across a bed 54 positioned on top of guide 31. Through a belt 49 the motor 47 drives a hollow shaft 46a carrying the saw blade 12. Liquid from reservoir 62 is supplied to the axial passage in shaft 46a through a flexible rubber hose 59 connected to hollow sleeve 64 at the end of shaft 46a remote from saw blade 12.

Thus, with the above-described arrangements of saws 12 and 13, opposite peripheral segments of the crystal slab are automatically severed from the slab by the power-driven saws as conveyor 11 carries the slab past the saws. The amount of material sawed off of the crystal slab is, of course, determined by the positions of the saw blades transversely with respect to the path of travel of conveyor 11 under the control of the above-described manual crank arrangement.

*Face grinding mechanism at first conveyor*

After passing the saws 12, 13 the conveyor 11 carries the holder block 33 and the partly machined crystal slab thereon to the second machining station, at which is located the grinder 14. This grinder is driven by a motor 100 mounted for vertical adjustment on a base 101 by means of a manually operated screw 102 and a meshing lead nut (not shown) integral with the motor housing. By a similar arrangement the base 101 is mounted for adjustment horizontally across bed 103 transversely of the direction of movement of the conveyor 11. The drive shaft of motor 100 extends down through vertical registering holes in the base 101 and bed 103 and at its lower end carries the grinding wheel or disk 14. Obviously, by adjusting the height of motor 100 the height of grinding wheel 14 can be adjusted to produce the desired grinding action on the upper face of the partly machined crystal slab, which face is remote from the conveyor 11 which advances the crystal slab. Bed 103 is mounted on top of the guides 31, 32 to straddle the conveyor 11, as shown in Fig. 1.

*Edge grinding mechanism at first conveyor*

As conveyor 11 continues its advance, it carries each crystal slab to the third machining station, at which the grinding wheels 15, 16 grind smooth the side edges of the crystal slab which were previously formed when the saws 12, 13 cut off the corresponding corners of the rough crystal slab.

Grinding wheel 15 is carried on the lower end of the drive shaft 104 of motor 105. This motor is mounted for manual adjustment vertically on base 106, and base 106 is mounted for manual adjustment horizontally on bed 107 transverse to the direction of travel of conveyor 11, all in the same manner as the grinder assembly at the second station, by means of manually operated screws each meshing with a lead nut carried by the respective relatively movable part. Bed 107 is mounted on top of guide 31. With this mechanism the height of the grinding wheel 15 can be adjusted to the proper level, as well as its horizontal position with respect to the side edge of the crystal slab which it is to grind smooth.

An identical assembly is provided for grinding wheel 16, so that it may be adjusted vertically and horizontally to properly engage the adjacent side edge of the crystal slab at the third station. This assembly for grinding wheel 16 includes the bed 108 mounted on top of guide 32, base 109 mounted on bed 108 for horizontal adjustment transverse to the direction of travel of conveyor 11, and motor 110 mounted on base 109 for vertical adjustment.

After passing beyond the third machining station the partly machined crystal slab is then carried by conveyor 11 down around the sprocket 111 mounted on idler shaft 112 at the far end of guides 31, 32. Shaft 112 is supported for rotation by bearing blocks **31*b*, 32*b* projecting from this end of the guides 31, 32**, respectively.

*Removal of partly machined crystal slab from first conveyor*

The conveyor 11 then carries the partly machined crystal slab clamped on the respective holder block 33 back along the lower track of the conveyor between the guides 31, 32 to the other end of the guides. Here, as each holder block passes around shaft 29, the clamping lever

40 coacts with the cam 44 thereat to effect release of the clamping lever from the crystal slab, as described in detail previously. When this occurs, the operator manually removes the partly machined crystal slab and places an unfinished rough crystal slab on the holder, which is then carried by the conveyor 11 through the above-described machining operations at the first, second and third stations.

*Sawing, face grinding and edge grinding mechanisms at second conveyor*

After its removal from the first conveyor 11 the partly machined crystal slab is then placed on a holder block 120 mounted on the second conveyor 17 in a manner identical to the mounting of each holder block 33 on the first conveyor 11. The second conveyor 17 travels in a horizontal path parallel to the first conveyor 11 between the spaced guides 121, 122. The clamping arrangement for securing the partly machined crystal slab on this holder is essentially the same as that shown in Fig. 3, except that the fixed abutment 123 and the clamping lever 124 have flat faces for engagement with the ground side edges of the slab, rather than the slab corner-engaging V-shaped seats on the corresponding elements of the Fig. 3 clamping arrangement associated with the first conveyor.

Figure 3:
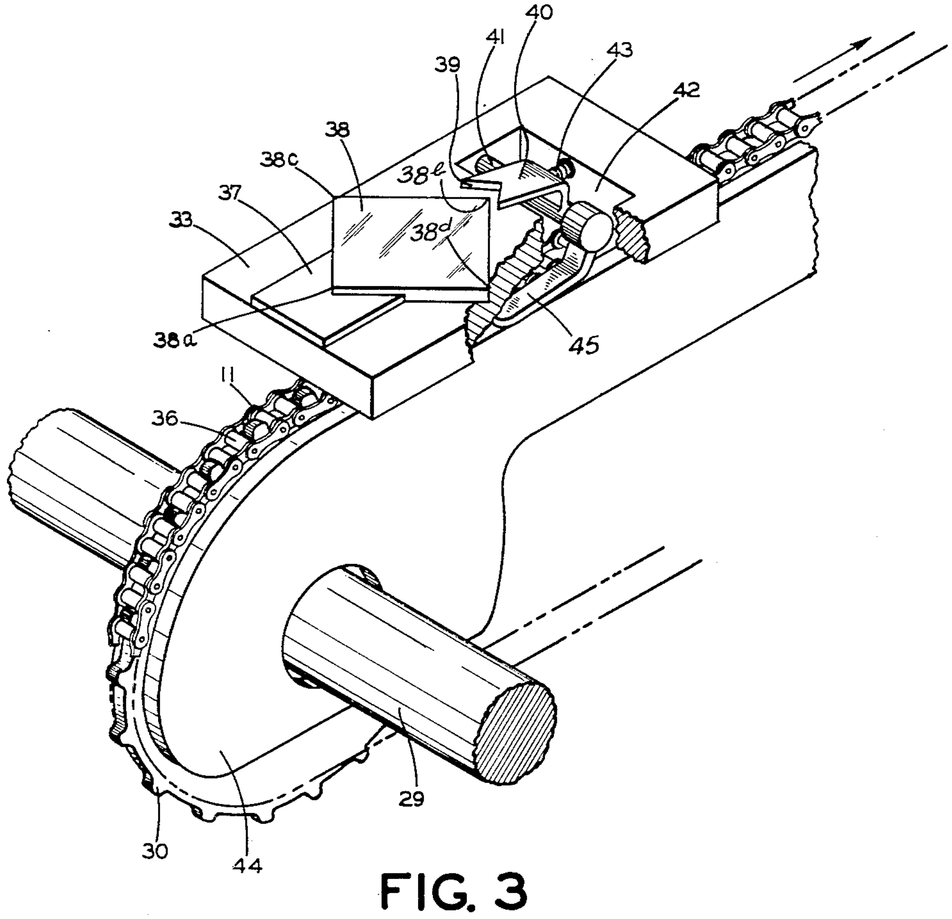
Figure 3 is an enlarged fragmentary perspective view showing mechanism according to the present invention for releasably retaining a crystal slab on a conveyor in the Fig. 1 apparatus.
Figure 4:
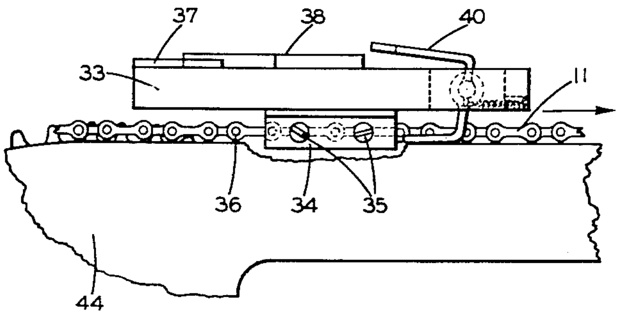
Figure 4 is a front view of a portion of the Fig. 3 mechanism.

In like manner with the slab-holding assembly of Fig. 3 the clamping lever 124 carries a depending arm 125 which rides across the periphery of a stationary cam 126 at shaft 29, so as to release at that location the clamping force on the crystal slab held in that holder. This enables the removal from the holder of a completely machined crystal slab traveling up around cam 126 and its replacement on the holder by a partly machined crystal slab which has just been through the first three machining stations along the first conveyor.

The partly machined crystal slab is placed on holder 120 as the latter passes across the top of cam 126. When the holder passes beyond this cam, the spring pressed clamping lever 124 automatically clamps the crystal slab tightly on the holder and maintains it securely in place until it has been carried completely around the track of the conveyor. The crystal slab is placed manually on the holder with its ground face down and its ground side edges positioned to engage the abutment 123 and the clamping lever 124 of the crystal holder assembly, and with the corners **38*a* and 38*b*** of the original rough slab projecting out on opposite sides thereof.

These corners **38*a* and 38*b* on the crystal slab are sawed off by the rotary saw blades 18, 19 as the conveyor carries this crystal slab past the fourth station, at which these saws are located. The saw blades are driven through belt drives from the motors 127, 128, respectively. The respective mountings for these motors on the guides 121 and 122 are identical to those for the drive motors for saws 12 and 13**, and hence need not be described in detail here.

Saws 18 and 19 are carried by hollow drive shafts 129 and **129*a* which receive liquid from tank 62 by way of conduit 61, downwardly extending hoses 130, 131, and the hollow sleeves 132, 133 at the outer ends of these shafts. Axial passages in these shafts communicate with hollow fittings abutting against the respective opposite faces of saws 18 and 19, these fittings corresponding in construction, location and function to the fittings 72, 73 in the assembly for saw blade 13** shown in Fig. 2. The liquid is discharged through peripheral passages in these fittings to the saw blades to lubricate the sawing operation and minimize fracture of the crystal slabs due to the sawing operation.

After having been sawed to substantially rectangular configuration by the removal of the remaining corners **38*a*, 38*b* of the original rough crystal slab, the crystal slab is then carried by conveyor 17 to the fifth machining station, at which is located the grinder 20. The assembly for the grinder at the fifth station is identical to the above-described mounting assembly for grinder 14 at the second machining station along conveyor 11 and includes the bed 140 mounted on top of guides 121, 122 to straddle the conveyor 17, base 141 mounted on bed 140 for adjustment horizontally transverse to the direction of travel of conveyor 17, and motor 142 vertically adjustable on base 141. The output shaft 143 of the motor extends down through registering holes in base 141 and bed 140 and carries at its lower end the polishing wheel 20** for engagement with the unground top face of the crystal slab.

Following the face grinding operation at the fifth machining station the conveyor 17 carries the crystal slab to the edge grinding mechanism at the sixth machining station. This mechanism includes the motor driven, spaced grinding wheels 21, 22 positioned to engage and grind smooth the opposite side edges of the crystal slab which were formed by the removal of slab corners 38*a*, 38*b* by the saws 18, 19.

At this station, grinding wheel 21 is carried on the lower end of the output shaft 150 of motor 151. Motor 151 is vertically adjustable on a base 152, which, in turn, is mounted on bed 153 for horizontal adjustment transverse to the direction of travel of conveyor 17. Bed 153 is mounted on top of the guide 121. With this arrangement, which is identical to the mounting for edge grinder 15 at the third station, grinding wheel 21 may be adjusted both vertically and horizontally to position it properly with respect to the adjacent side edge of the crystal slab.

In like manner, at the opposite side of the conveyor the grinding wheel 22 is carried on the lower end of motor drive shaft 154. Motor 155 for this grinder is vertically adjustable on base 156, which is adjustable horizontally on bed 157 transverse to the direction of travel of conveyor 17. Bed 157 is mounted on top of guide 122.

The completely machined crystal slab is continued to be advanced by conveyor 17 beyond the sixth, and final, machining station. The support block 120 carrying the finished crystal slab passes down around the sprocket 160 mounted on idler shaft 112 at the far end of guides 121, 122. Then the conveyor carries the crystal slab back along the lower track of the conveyor to the cam 126, where the finished crystal slab is removed manually from its holder 120, as described.

*Operation of Fig. 1 apparatus*

Reviewing the operation of the Fig. 1 machine, rough crystal slabs of substantially rectangular shape are manually positioned individually on each holder 33 as that holder passes around cam 44. As the first conveyor 11 passes beyond cam 44 the clamping lever 40 automatically clamps the crystal slab in place on the holder, with an opposite pair of corners 38*c* and 38*d* on the slab projecting on either side of the clamp mechanism.

As the conveyor 11 advances the crystal slab past the first machining station the rotary saws 12 and 13 cut off corner segments of the crystal slab at the opposite corners 38*c* and 38*d* to form substantially flat side edges on the crystal slab there. Next, the conveyor 11 carries the crystal slab past the grinder 14, which grinds smooth the upper face of the crystal slab. As the conveyor continues its advance it moves each crystal slab through the third machining station, at which the motor driven grinders 15, 16 grind smooth the side edges of the crystal slab which were formed initially when saws 12, 13 cut off the corners of the slab.

Following the third machining operation, the partly machined crystal slab is carried by conveyor 11 down around sprocket 111 and back along the lower return track of the conveyor to the cam 44 at the input end of the conveyor. Here, the depending leg 45 on the clamping lever 40 rides across the peripheral surface of cam 44, thereby moving clamping lever 40 away from engagement with the partly machined crystal slab. When this occurs, the partly machined crystal slab is removed from its holder manually by the operator and a rough crystal slab inserted onto that holder to be carried through the first three machining operations, as described.

After its removal from the first conveyor the partly machined crystal slab is then manually placed on an empty holder 120 on the second conveyor 17 at cam 126. The ground face of the partly machined crystal slab is at the underside of the slab on this holder and the uncut corners 38*a* and 38*b* of the holder project out on opposite sides of clamping lever 124 and abutment 123 associated with this holder. As holder 120 passes beyond cam 126, its clamping lever 124 automatically clamps the partly machined crystal slab securely in place on this holder.

The second conveyor 17 advances this crystal slab through the fourth machining station, where the saws 18, 19 cut off the projecting corners 38*a* and 38*b* of the slab to make the slab substantially rectangular in configuration. Then, as the conveyor 17 continues its advance it carries this crystal slab past the fifth machining station, at which the grinder 20 grinds smooth the upper face of the crystal slab. Following this, the crystal slab is carried by conveyor 17 past the spaced grinders 21, 22, which grind smooth the opposite side edges of the crystal slab formed by the removal of corners 38*a* and 38*b* by saws 18 and 19, as described.

After the final, edge grinding operation at grinders 21, 22, the support block 120 carrying the completely machined crystal plate is carried by conveyor 17 down around sprocket 160 at the far end of the machine and then back along the lower track of this conveyor to cam 126. Here, the clamping lever 124 on this holder rides across the cam and is moved thereby to release the clamping force on the finished crystal plate. When this happens, the finished crystal plate is removed from the holder manually by the operator and another partly machined crystal slab is placed on that holder to be carried through the final three machining operations along conveyor 17, as described.

From the foregoing it will be apparent that the illustrated embodiment of the present invention, shown in Fig. 1, carries the crystal slab through various automatic machining operations by means of which a rough crystal slab is converted into a crystal plate of suitable size, shape and orientation for installation and use in piezoelectric crystal apparatus. While the particular arrangement shown in Fig. 1 produces a finished crystal plate having side edges oriented at 45° with respect to those on the rough crystal slab, because of the described corner sawing operations, it is to be understood that it is within the purview of the present invention to saw off peripheral segments of the crystal slab to produce a crystal plate whose side edges extend substantially parallel to the side edges of the original rough crystal slab. To this end, all that is required is a slight modification of the slab holders carried by the conveyors, so that sides, rather than corners, of the rough crystal slab would be positioned to be severed by the saws as each conveyor carries the crystal slab past the respective saws.

With the machine of the present invention these various operations may be performed with only a minimum of attention and skill required of the operator in a substantially continuous sequence to produce finished crystal plates at a relatively high rate of speed.

*Multiple sawing*

In some instances it has been considered desirable to perform only the corner sawing operations with the Fig. 1 mechanism, with the face grinding and edge grinding operations being performed at separate machines. Accordingly, the face grinders 14 and 20 and the edge grinders 15, 16, 21 and 22 may be de-activated or removed from the Fig. 1 mechanism, leaving only the saws 12, 13, 18 and 19 as the tools in this assembly to perform machining operations on the crystal slabs. When this is done, it is possible to multiply the output of the machine by mounting several crystal slabs on each holder carried by the respective conveyor.

Figures 5, 6:
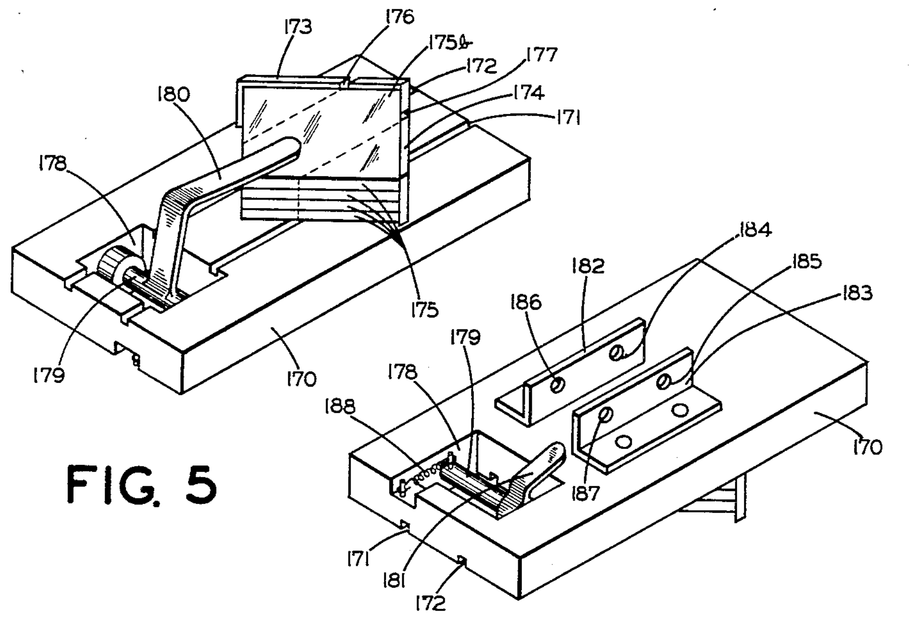
Figure 5 is a top perspective view of an alternative crystal slab holder for supporting a stack of crystal slabs and intended for mounting on the first conveyor of the Fig. 1 assembly for multiple sawing operations, with the face and edge grinders in the Fig. 1 apparatus deactivated.
Figure 6 is a perspective view of the underside of the Fig. 5 holder.

Accordingly, Figs. 5 and 6 show a preferred embodiment of a holder adapted to be mounted on the first conveyor 11 to carry crystal slabs past the saws 12, 13 in this alternative embodiment of the machine. This holder includes a rectangular base 170 having a pair of spaced grooves or channels 171, 172 formed in its upper face in alignment with the saws 12 and 13, respectively, so that this base may pass beneath these saws without engagement therewith. A pair of adjoining upstanding walls 173, 174 are mounted on the upper face of block 170 and at their intersection define a right-angled corner for receiving snugly the forward corners 175b of a plurality of vertically stacked rough crystal slabs 175, here shown as four in number. Vertical slots 176, 177 are formed in these walls in alignment with the base slots 171, 172 to pass the saw blades. Adjacent the back end of the block 170 it is formed with a hole 178 at which a cross pin 179 is mounted pivotally. Integral with cross pin is a retaining arm 180 whose forward end overlies the stack of crystal slabs 175. A depending arm 181 (Fig. 6), also integral with cross pin 179, extends below the underside of base 170 in position to engage the peripheral surface of cam 44 (Fig. 3). A tension coil spring 188 biases retaining arm 180 clockwise in Fig. 5 to normally bear against the uppermost slab in the stack.

At its lower face base 170 also carries a pair of mounting angle brackets 182, 183 formed with registering spaced pairs of holes 184, 185, 186 and 187 for receiving the cross pins 36 on the chain link conveyor 11 to mount base 170 on the conveyor.

In the above described alternative or modified mechanism, the conveyor 11 of the Fig. 1 assembly carries a plurality of the Fig. 5 holders successively past the saws 12 and 13. A plurality of crystal slabs 175 are stacked on the base 170 of this holder as shown in Fig. 5, with the forward corners of the crystal slabs received in the right-angled corner formed at the intersection of the upstanding walls 173, 174 of the holder. These crystal slabs are placed on each holder as the holder passes around the cam 44 in Fig. 1, at which time the depending arm 181 on the clamping lever rides across the peripheral surface of the cam and pivots the entire clamping lever counterclockwise in Fig. 5 against the bias of spring 188. Thereafter as this holder passes beyond cam 44 spring 188 automatically moves the retaining arm 180 on the clamping lever into engagement with the top crystal slab in the stack.

As conveyor 11 continues its advance it moves the holder past saws 12 and 13. The saws pass through the holder slots 176, 172 and 177, 171 without contacting the holder and saw off the corners of the stacked crystal slabs along the dotted lines in Fig. 5.

Thereafter, this holder is carried by conveyor 11 back around to cam 44, where the partially machined crystal slabs are removed manually by the operator and a new stack of rough crystal slabs is placed on that holder.

Figures 7, 8:
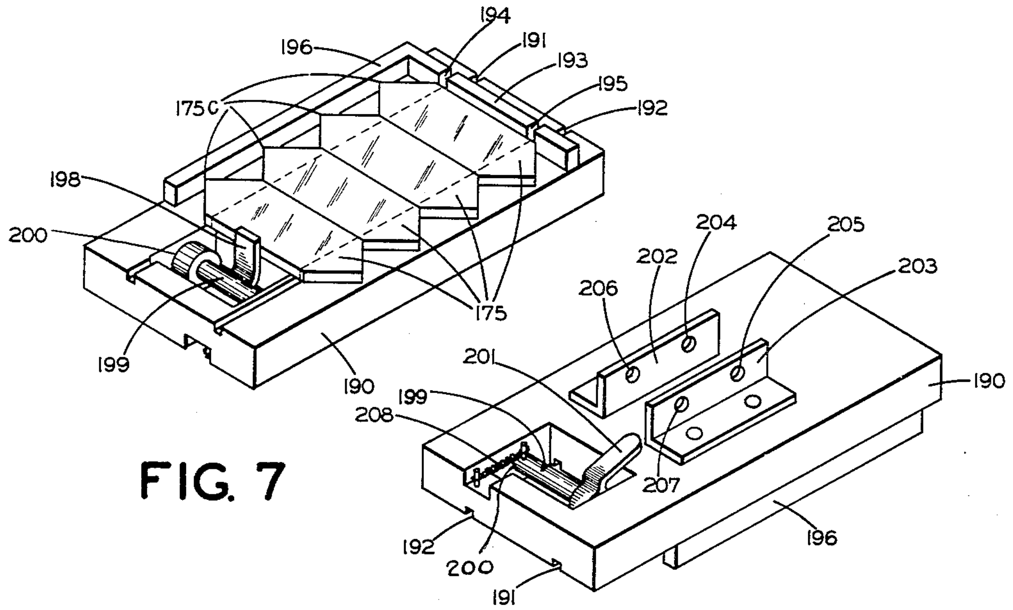
Figure 7 is a top perspective view of a second alternative crystal slab holder for supporting a plurality of crystal slabs in a row and intended for mounting on the second conveyor of the Fig. 1 assembly for multiple sawing when the face and edge grinders are deactivated in this apparatus.
Figure 8 is a perspective view of the underside of the Fig. 7 holder.

In this modified mechanism, the crystal slab holders mounted on the second conveyor 17 are preferably of the type shown in Figs. 7 and 8. Each of these holders comprises a flat rectangular base block 190 formed with a pair of channels or slots 191, 192 along its upper face located in alignment with the saws 18 and 19, respectively, of the machining apparatus shown in Fig. 1. An upstanding front wall 193 mounted on the upper face of base 190 is formed with a pair of vertical slots 194, 195, which are aligned respectively with the base slots 191 and 192 to pass the saw blades 18 and 19. An upstanding wall 196 extends lengthwise along one side of the top face of base 190 and terminates at its forward end at the front wall 193. In use, a plurality of partly machined crystal slabs 175 are placed in end-to-end relation on the top face of base 190 with the forward edge of the front slab in the row abutting against front wall 193 and with the corners 175c of each respective crystal slab abutting against the upstanding side wall 196.

The slabs are retained in this position on the holder by a clamping lever which includes an upstanding arm 198 which normally bears against the back edge of the rear crystal slab in the row. Integral with arm 198 is a cross pin 199 pivotally mounted on base 190 at a hole 200 therein. A depending arm 201 (Fig. 8) on this lever, also integral with cross pin 199, normally extends below the bottom face of base 190 and is positioned to engage the peripheral surface on cam 126 of Fig. 1 when the holder passes around this cam. Tension coil spring 208 normally biases lever arm 198 clockwise in Fig. 7 into engagement with the rear slab on the holder.

At its underside base 190 carries a pair of mounting angle brackets 202 and 203 formed with pairs of registering holes 204, 205, 206 and 207 for receiving the cross pins on the chain link conveyor 17 to mount the holder on this conveyor.

The operation of this holder in the modified assembly is as follows: As the holder is carried by conveyor 17 around cam 126 the depending arm 201 on the clamping lever rides across the periphery of the cam, pivoting this lever counterclockwise in Fig. 7 against the bias exerted by spring 208. The partly machined crystal slabs 175 are then placed in a row on top of base 190, as shown in Fig. 7, with their uncut corners projecting outward beyond the base slots 191 and 192, respectively. Thereafter, as conveyor 17 carries this holder beyond cam 126, spring 208 moves the clamping lever clockwise in Fig. 7 to position its retaining arm 198 in engagement with the rear crystal slab in the row to retain the crystal slabs in their respective positions, shown in Fig. 7.

The conveyor 17 continues its advance and carries this holder with the crystal slabs thereon past the saw blades 18 and 19 in Fig. 1. The saw blades cut off the projecting corners of the crystal slabs along the dotted lines in Fig. 7 without, however, contacting the holder.

Following this, conveyor 17 carries the crystal slabs back around to cam 126, where they are removed manually by the operator and a new set of partially machined crystal slabs placed on that holder.

Obviously, with this modified mechanism, the only operations performed are the corner sawing operations. The face and edge polishing operations necessary to the production of finished crystal plates are done at different machines. However, it is a factor of note that in this modified mechanism the corner removing operations are carried out at an increased rate because of the manner in which several crystal slabs are positioned on each holder during these operations.

Here again, with this modified mechanism it would require only a relatively slight modification of the holders to adapt the mechanism to make edge cuts of the crystal slab parallel to the original side edges thereof, rather than at 45° thereto, since such adaptation of this mechanism could be made readily by one skilled in the art.

*Alternative sawing mechanism*

Figure 9:
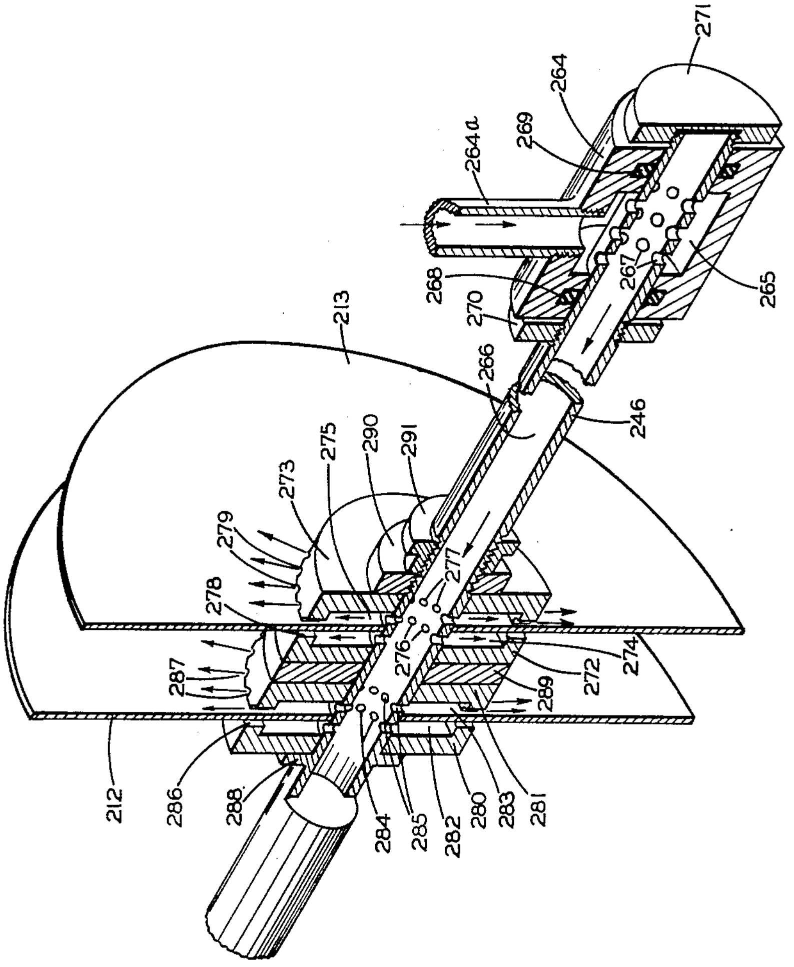
Figure 9 is a fragmentary perspective view, partly broken away, showing an alternative crystal sawing mechanism according to the present invention.

Figure 9 shows an alternative mechanism in accordance with the present invention which is particularly adapted for multiple sawing of several crystal slabs simultaneously or for simultaneously sawing a natural crystal bar into a plurality of rough crystal slabs.

This alternative sawing mechanism includes a hollow, rotary, motor driven shaft 246 which carries a plurality of spaced cutting discs, here shown as two in number, 212 and 213. For spraying the peripheral cutting edges of the cutting discs or saw blades with liquid there is provided an arrangement essentially similar to that in the Fig. 2 saw assembly. This spraying arrangement includes a pipe 264a which feeds liquid down into the internal chamber 265 of hollow sleeve 264. This sleeve chamber communicates through holes 267 in the shaft with the axial shaft passage 266. O-ring seals 268, 269 are carried by sleeve 264 to prevent liquid from leaking out of sleeve chamber 265 along the periphery of shaft 246. Nuts 270 and 271 are threaded onto shaft 246 at opposite ends of sleeve 264 to maintain a fixed axial relation between the sleeve and the shaft.

At opposite sides of saw blade 213 the shaft 246 carries a pair of annular hollow fittings 272, 273 abutting against the respective saw blade faces and formed with annular chambers 274, 275, respectively, which communicate with shaft passage 266 through series of holes 276, 277 in the shaft. At their respective outer peripheries the fittings 272, 273 are formed with radial passages 278, 279 at the opposite faces of cutting disc 213 which lead from the chambers 274, 275 to pass therefrom the liquid delivered to shaft passage 266. These liquid discharge passages 278, 279 are contiguous to, and open at, the respective faces of cutting disc 213. With this arrangement, liquid is passed radially outward along the faces of cutting disc 213 to the cutting edge thereof as the unitary assembly of shaft 246, cutting disc 213 and fittings 272, 273 rotates.

In like manner, the hollow fittings 280, 281 on opposite sides of cutting disc 212 have internal annular chambers 282, 283 extending around shaft 246 and communicating with shaft passage 266 through series of holes 284, 285 therein. Peripheral passages 286, 287 in these fittings pass liquid from the chambers 282, 283 along the opposite faces of cutting disc 212 to the peripheral cutting edge thereof as the assembly of cutting disc 212 and the fittings 280, 281 rotates.

In the saw blade assembly on shaft 246, fitting 280 abuts against an integral transverse collar 288 on the shaft. A spacer 289 is located between the fittings 281 and 272 and serves to space apart the cutting discs 212 and 213 by the desired amount. A washer 290 and an abutting lock nut 291 are threaded onto shaft 246 and bear against the outer face of fitting 273 to force the assembly of saw blades 212, 213 and fittings 280, 281, 272, 273 against collar 288.

Obviously, in the above assembly any number of spacer blocks 289 of desired thickness may be provided so as to achieve the desired spacing between the peripheral cutting edges of the saw blades 213. Also, more than two cutting discs may be mounted on the shaft, simply by duplicating the mounting of either of the cutting discs shown in Fig. 9. Thus, the basic concept of the Fig. 9 arrangement renders it adaptable to numerous multiple saw blade assemblies by which a desired plurality of cuts are made simultaneously, either on separate crystal slabs or on a crystal bar which is being cut up into crystal slabs.

While in the foregoing description and in the accompanying drawings there are disclosed preferred embodiments of the present invention, it is to be understood that various modifications, omissions, and refinements which depart from the specific disclosed mechanisms may be adopted without departing from the spirit and scope of present invention.

What is claimed is:

1. Apparatus for machining a piezoelectric crystal slab comprising, in combination, an endless conveyor movable past preselected successive machining stations, a holding device mounted on said conveyor for movement therewith and operative to retain a crystal slab on said conveyor for movement past said stations, a pair of spaced, power driven, rotary saws located at a first one of said stations and positioned to saw off spaced peripheral segments of the crystal slab to form edge faces thereat as the conveyor moves said crystal slab through said first station, a grinder located at a second station along the conveyor positioned in confronting relation with a major face of the crystal slab to grind smooth said face of the crystal slab as the conveyor moves the crystal slab through said second station, edge polishing mechanism located beyond said second station in the direction of travel of the conveyor and positioned to engage and grind smooth said edge faces on the crystal slab as the conveyor continues its advance, and means operative in response to the continued movement of the holding device beyond said edge polishing mechanism as the conveyor continues its advance to actuate said holding device to disengage from the crystal slab for removal of that crystal slab from the conveyor.

2. The apparatus of claim 1, wherein said holding device comprises a pivoted clamping lever for engagement with the crystal slab and a spring biasing the clamping lever into engagement with the crystal slab, and said last-mentioned means comprises a stationary cam located adjacent the conveyor beyond said edge polishing mechanism in the direction of travel of the conveyor and positioned to be engaged by said clamping lever to pivot the clamping lever against its spring bias to disengage from the crystal slab as said clamping lever is carried by the conveyor past said cam.

3. Apparatus for machining a piezoelectric crystal slab comprising, in combination, an endless conveyor movable in succession between preselected stations, a holding device mounted on said conveyor for movement therewith and operative to retain a crystal slab on said conveyor for movement between said stations, a pair of spaced, power driven, rotary saws located at a first one of said stations and positioned to saw off opposite marginal segments of the crystal slab to form peripheral edge faces thereat as the conveyor moves said crystal slab through said first station, a grinder located at a second station along the conveyor positioned in confronting relation with the upper face of the crystal slab to grind smooth said upper face of the crystal slab as the conveyor moves the crystal slab through said second station, edge polishing mechanism located beyond said second station in the direction of travel of the conveyor and positioned to engage and grind smooth said peripheral edge faces on the crystal slab as the conveyor moves the crystal slab past said edge polishing mechanism, and means responsive to the continued movement of the holding device beyond said edge polishing mechanism as the conveyor continues its advance for actuating said holding device to disengage from the crystal slab for removal of that crystal slab from the conveyor.

4. Apparatus for machining a piezoelectric crystal slab comprising, in combination, an endless conveyor movable past preselected successive stations, a holding device mounted on said conveyor for movement therewith and operative to retain a crystal slab on said conveyor for movement between said stations, a pair of spaced, power driven, rotary saws located above said conveyor and at opposite sides thereof at a first one of said stations and positioned to saw off opposite peripheral segments of the crystal slab to form opposite peripheral edge faces thereat as the conveyor moves said crystal slab through said first station, a grinder located above said conveyor at a second station along the conveyor beyond said first station in the direction of travel of the conveyor and positioned in confronting relation with the upper face of the crystal slab to grind smooth said upper face of the crystal slab as the conveyor moves the crystal slab through said second station, a pair of spaced grinders located at opposite sides of the conveyor at a third station along the conveyor beyond said second station in the direction of travel of the conveyor and positioned to engage and grind smooth said peripheral edge faces on the crystal slab as the conveyor moves the crystal slab through said third station, and means responsive to the continued movement of the holding device beyond said third station as the conveyor continues its advance for actuating said holding device to disengage from the crystal slab for removal of that crystal slab from the conveyor.

5. Apparatus for machining a piezoelectric crystal slab comprising, in combination, an endless belt conveyor having an upper advance track and a lower return track below said advance track, spaced rotary driving sprockets engaging the conveyor at opposite ends of said advance and return tracks for advancing the conveyor along an endless path through said advance and return tracks, a crystal slab holder mounted on said conveyor to move therewith, a retainer mounted on said holder and normally maintained in engagement with the crystal slab to retain the latter on the holder in the movement of the holder by the conveyor through the advance and return tracks of the conveyor, power driven rotary saws overlying the advance track of the conveyor at opposite sides thereof and positioned to sever opposite peripheral segments of the crystal slab as the holder carries the crystal slab past the saws in the movement of the conveyor, a stationary cam positioned adjacent one of said sprockets and presenting a cam surface which extends up around said sprocket from the end of the return track of the conveyor to the beginning of the advance track of the conveyor, and a projection on said retainer positioned to engage and ride across said cam surface to move the retainer to release the crystal slab on the holder upon movement of the holder up around said one sprocket from the end of the return track of the conveyor to the beginning of the advance track of the conveyor.

6. The combination of claim 5, wherein said holder supports at its outer side remote from the conveyor a fixed abutment which defines a V-shaped recess for receiving and locating one corner of the crystal slab positioned on the holder, and said retainer comprises a lever pivotally mounted on the holder and having an arm which overlies said outer side of the holder, said lever arm presenting a V-shaped recess in spaced confronting relation to said V-shaped recess on the fixed abutment, a spring acting between the holder and said lever biasing said lever arm toward said abutment to position said V-shaped recess in the lever arm in engagement with the opposite corner of the crystal slab on the holder, and said projection on the retainer is in the form of an arm of said lever depending from the holder in a direction toward the conveyor.

7. The combination of claim 5, wherein said holder supports at its outer side remote from the conveyor a pair of upstanding walls which define a V-shaped recess for receiving and locating one corner of each of a stack of crystal slabs positioned on the holder, each of said walls being formed with a slot for passing the saws in the movement of the holder past the saws, and said retainer comprises a lever pivotally mounted on the holder and having an arm which extends toward said upstanding walls and which overlies said outer side of the holder, a spring acting between the holder and the lever biasing said lever arm toward said outer side of the holder to engage the outer face of the outermost crystal slab in the stack on the holder, and said projection on the retainer is in the form of an arm of said lever depending from the holder in a direction toward the conveyor.

8. The combination of claim 5, wherein said holder adjacent one of its ends at its outer side remote from the conveyor supports an upstanding transverse wall which extends transverse to the direction of movement of the conveyor and which presents a flat face for abutment by an edge of the end crystal slab in a row of crystal slabs mounted on the outer side of the holder, said wall having a pair of slots for passing the saws in the movement of the holder past the saws, said holder at its outer side remote from the conveyor also supports an upstanding side wall along one of its sides for engagement by a corner of each of the crystal slabs in said row, and said retainer comprises a lever pivotally mounted on the holder and having an arm positioned at the opposite end of said row of crystal slabs remote from said upstanding transverse wall, a spring acting between the holder and said lever biasing said lever arm into engagement with the edge of the end crystal slab in said row remote from the upstanding transverse wall, and said projection on the retainer is in the form of an arm of said lever depending from the holder in a direction toward the conveyor.

9. Apparatus for machining piezoelectric crystal slabs comprising, in combination, an endless conveyor mounted for movement through an upper advance path of movement and through a lower return path of movement below said advance path, means for moving said conveyor through said advance and return paths of movement, a crystal slab holder mounted on said conveyor to move therewith, a retainer mounted on said holder and normally biased to engage and retain on the holder crystal slabs positioned thereon in the movement of the holder by the conveyor through the advance and return paths of movement of the conveyor, power driven rotary saws extending adjacent said advance path of movement of the conveyor and positioned to sever opposite peripheral segments of the crystal slabs as the holder carries the crystal slabs past the saws, a stationary cam positioned adjacent the path of the conveyor as it moves up from the end of the return path of its movement to the beginning of the advance path of its movement, and a projection on said retainer positioned to engage and ride across said cam to move the retainer to release the crystal slabs on the holder upon movement of the holder up from the end of the return track of the conveyor to the beginning of the advance track of the conveyor.

10. The combination of claim 9, wherein said holder supports at its outer side remote from the conveyor a pair of upstanding walls which define a V-shaped recess for receiving one corner of each of a stack of crystal slabs positioned on the holder, each of said walls being formed with a slot for passing the saws in the movement of the holder past the saws, and said retainer comprises a lever pivotally mounted on the holder and having an arm which extends toward said upstanding walls and which overlies said outer side of the holder, a spring acting between the holder and the lever biasing said lever arm toward said outer side of the holder to engage the outer face of the outermost crystal slab in the stack on the holder, and said projection on the retainer is in the form of an arm of said lever depending from the holder in a direction toward the conveyor.

11. The combination of claim 9, wherein said holder adjacent one of its ends at its outer side remote from the conveyor supports an upstanding transverse wall which extends transverse to the direction of movement of the conveyor and which presents a flat face for abutment by an edge of the end crystal slab in a row of crystal slabs mounted on the outer side of the holder, said wall having a pair of slots for passing the saws in the movement of the holder past the saws, said holder at its outer side remote from the conveyor also supports an upstanding side wall along one of its sides for engagement by a corner of each of the crystal slabs in said row, and said retainer comprises a lever pivotally mounted on the holder and having an arm positioned at the opposite end of said row of crystal slabs remote from said upstanding transverse wall, a spring acting between the holder and said lever biasing said lever arm into engagement with the edge of the end crystal slab in said row remote from the upstanding transverse wall, and said projection on the retainer is in the form of an arm of said lever depending from the holder in a direction toward the conveyor.

12. In apparatus for machining piezoelectric crystal slabs, the combination of an endless conveyor mounted for movement through an upper advance path of movement and a lower return path of movement below said advance path, means for moving said conveyor through said advance and return paths of movement, a crystal slab holder mounted on said conveyor to move therewith, a retainer mounted on said holder and normally biased to engage and retain on the holder crystal slabs positioned thereon in the movement of the holder by the conveyor through the advance and return paths of movement of the conveyor, power driven rotary saws positioned adjacent said advance path of movement of the conveyor and positioned to sever opposite peripheral segments of the crystal slabs as the holder carries the crystal slabs past the saws, and means for actuating said retainer to release the crystal slabs upon movement of the holder up from the end of the return path of movement of the conveyor to the beginning of the advance path of movement of the conveyor.

References Cited in the file of this patent

UNITED STATES PATENTS

| | | |
|---|---|---|
| 643,914 | Shaw | Feb. 20, 1900 |
| 665,661 | Ketley et al. | Jan. 8, 1901 |
| 697,383 | Milligan et al. | Apr. 8, 1902 |
| 803,794 | Starbuck | Nov. 7, 1905 |
| 870,056 | Smith | Nov. 5, 1907 |
| 1,384,756 | Harnbuechen | July 19, 1921 |
| 1,491,515 | Chase | Apr. 22, 1924 |
| 1,522,523 | Jerome | Jan. 13, 1925 |
| 1,534,393 | Joseph | Apr. 21, 1925 |
| 1,862,277 | Moon | June 7, 1932 |
| 1,862,704 | Prouty et al. | June 14, 1932 |
| 1,922,817 | Morton | Aug. 15, 1933 |
| 2,109,450 | Schlayer et al. | Mar. 1, 1938 |
| 2,361,961 | Pruitt | Nov. 7, 1944 |
| 2,382,257 | Ramsay | Aug. 14, 1945 |
| 2,413,016 | Wiken et al. | Dec. 24, 1946 |
| 2,439,466 | Gravley | Apr. 13, 1948 |

FOREIGN PATENTS

| | | |
|---|---|---|
| 34,151 | Germany | Sept. 11, 1884 |